United States Patent
Gargi et al.

(10) Patent No.: US 8,725,113 B2
(45) Date of Patent: May 13, 2014

(54) USER PROXIMITY CONTROL OF DEVICES

(75) Inventors: Ullas Gargi, Sunnyvale, CA (US); Rich Gossweiler, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 64 days.

(21) Appl. No.: 13/417,818

(22) Filed: Mar. 12, 2012

(65) Prior Publication Data
US 2013/0324081 A1    Dec. 5, 2013

(51) Int. Cl.
*H04M 1/66* (2006.01)

(52) U.S. Cl.
USPC ........... 455/411; 455/410; 455/420; 713/168; 380/247; 380/248; 380/249; 380/250

(58) Field of Classification Search
USPC .......................... 455/411, 410, 421; 713/168; 380/247–250
See application file for complete search history.

(56) References Cited

U.S. PATENT DOCUMENTS

| | | | |
|---|---|---|---|
| 8,140,012 B1 * | 3/2012 | Causey et al. | 455/41.2 |
| 2005/0221798 A1 | 10/2005 | Sengupta et al. | |
| 2009/0253410 A1 * | 10/2009 | Fitzgerald et al. | 455/411 |
| 2009/0254975 A1 | 10/2009 | Turnbull et al. | |
| 2010/0082487 A1 * | 4/2010 | Nelsen | 705/44 |
| 2010/0169949 A1 * | 7/2010 | Rothman et al. | 726/1 |
| 2010/0197271 A1 * | 8/2010 | Yoshikawa et al. | 455/411 |
| 2011/0195699 A1 * | 8/2011 | Tadayon et al. | 455/418 |
| 2011/0237221 A1 | 9/2011 | Prakash et al. | |
| 2011/0241838 A1 | 10/2011 | Wischmeyer | |
| 2011/0314539 A1 | 12/2011 | Horton | |
| 2012/0015629 A1 | 1/2012 | Olsen et al. | |

FOREIGN PATENT DOCUMENTS

| | | |
|---|---|---|
| EP | 1 835 468 A2 | 9/2007 |
| EP | 1 971 169 A1 | 9/2008 |

OTHER PUBLICATIONS

Simonite, Tom, "One Smartphone, Two Personalities", Technology Review, http://www.technologyreview.com/printer_friendly_article.aspx?id=38865, accessed Oct. 31, 2011 (published by MIT) (2 pages).

Search report and examination report, GB Application No. 1304308.8, mailed on Sep. 26, 2013.

\* cited by examiner

*Primary Examiner* — Allahyar Kasraian
*Assistant Examiner* — Sayed T Zewari
(74) *Attorney, Agent, or Firm* — Leydig, Voit & Mayer, Ltd.

(57) ABSTRACT

Examples of embodiments provide systems and methods for varying the functions of an electronic device according to a physical relationship (e.g. the distance) between the electronic device and the primary user (e.g., owner) of the electronic device. The device may measure the distance using a wireless signal from a secondary device carried by or associated with the primary user. In some embodiments, the electronic device may change its functions based on its environment, in combination with the distance between the electronic device and the primary user. Environmental factors may include the device's location, the device's velocity, and the date and time of day.

27 Claims, 4 Drawing Sheets

| Threshold Distance | Phone | Msging | Email | Calendar | Contacts | Nav | Games | Browser Credentials | Function N |
|---|---|---|---|---|---|---|---|---|---|
| Possession | EN | EN | EN | EN | EN | EN | EN | EN | EN |
| Within 5 Meters | EN | DIS | DIS | DIS | DIS | EN | EN | DIS | DIS |
| Beyond 5 Meters | DIS | DIS | DIS | DIS | DIS | DIS | EN | DIS | DIS |

FIG. 3

USER PROXIMITY CONTROL OF DEVICES

FIELD

This disclosure relates to controlling access and functionality of electronic devices.

BACKGROUND

Electronic devices are typically configured to be personal devices by their users, such as their primary users, which are often their owners. For example, the primary user of an electronic device will typically store personal contact information and device or application setting preferences on the device.

For the sake of convenience, the primary user of an electronic device will also typically relax the security measures required for them to access and use the personal information and preferences stored on the device. For example, the primary user will often configure a device or application executing on the device to "remember" usernames and passwords, such that a user does not need to manually enter a username and password each time he uses an application or capability of the device. Similarly, the primary user will often configure a device to relax the security measures required to access and use remote services, for example, by configuring the device to automatically supply security information (e.g., a username and password, a token, a cookie, etc.) to a remote application that is accessed via the personal electronic device, such as an application running on a web server.

Despite all the personal and private information accessible via an electronic device, they are nonetheless sometimes used by persons other than their primary users. This is especially prevalent for portable or mobile electronic devices, such as smart phones, music playing devices, hand-held gaming devices, and the like. For example, the primary user of an electronic device may lend or share the device with a friend or family member so that the friend or family member may enjoy music or video on the device, employ the device for navigation, play electronic games on the device, browse the Internet, make a phone call, etc. In addition, the primary user of an electronic device such as a cell phone may lend the device to a stranger in an exigent situation to make a phone call. Or, an unauthorized person may attempt to use the device when it is not near its authorized users.

SUMMARY OF THE DISCLOSURE

The present disclosure describes, among other things, methods that may be performed by an electronic device that include operations such as recording information associating a primary user with the electronic device, evaluating a physical relationship between the primary user and the electronic device with respect to a threshold distance, transitioning the electronic device to a first access state if the physical relationship between the primary user and the electronic device exceeds the threshold distance, and transitioning the electronic device to a second access state if the physical relationship between the primary user and the electronic device does not exceed the threshold distance. In various embodiments, electronic devices may include mobile devices such as smart phones, tablet computers, netbook computers, laptop computers, computerized music player, computerized hand-held gaming device, and the like, and remote computing systems, such as servers, that communicate with electronic devices.

Other variants described include electronic devices that comprise, among other things, a memory containing instructions and a processor that is operably connected to the memory. In such variants, the processor may execute the instructions to perform operations including recording information associating a primary user with the electronic device, evaluating a physical relationship between the primary user and the electronic device with respect to a threshold distance, transitioning the electronic device to a first access state if the physical relationship between the primary user and the electronic device exceeds the threshold distance, and transitioning the electronic device to a second access state if the physical relationship between the primary user and the electronic device does not exceed the threshold distance.

Still other variants described include non-transitory computer-readable medium that include instructions. In such variants, a processor may execute the instructions to perform operations comprising, among other things, recording information associating a primary user with the electronic device, evaluating a physical relationship between the primary user and the electronic device with respect to a threshold distance, transitioning the electronic device to a first access state if the physical relationship between the primary user and the electronic device exceeds the threshold distance, and transitioning the electronic device to a second access state if the physical relationship between the primary user and the electronic device does not exceed the threshold distance.

BRIEF DESCRIPTION OF THE DRAWINGS

In the figures:

FIG. 3 illustrates examples of proximity function profiles for an electronic device, consistent with the present disclosure.

DESCRIPTION OF EMBODIMENTS

Described herein are systems and methods that may be used to vary, change, or alter the functions, abilities, or capabilities of an electronic device (e.g., a mobile or portable, personal electronic device, such as a smart phone, a tablet computer, a laptop computer, a computerized game system, a computerized music player, and the like) according to the proximity of a user to the mobile device.

Figure 1:
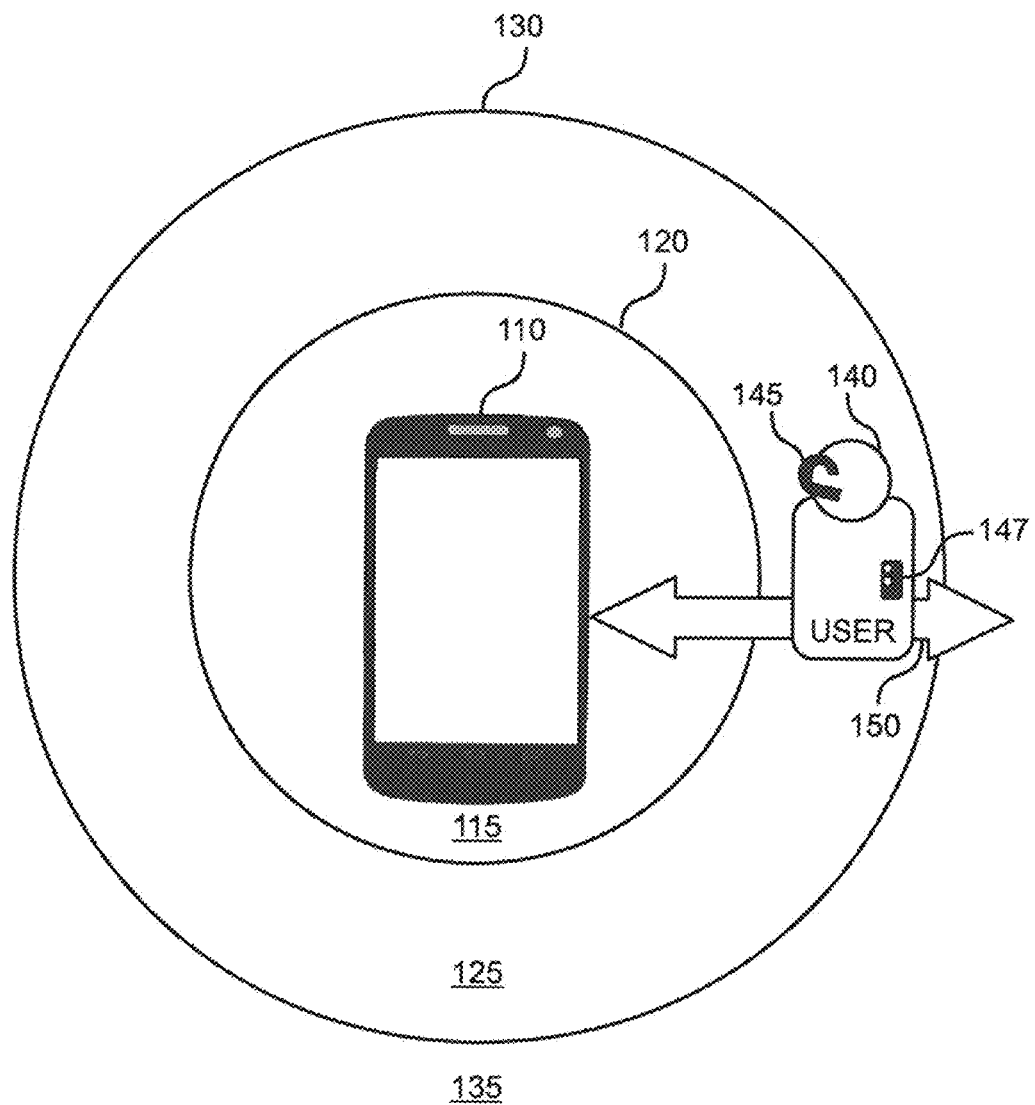
FIG. 1 illustrates an example of a variable function mobile device, consistent with the present disclosure.

For example, FIG. 1 illustrates a mobile device 110, and a primary user 140, who may be in physical contact with the mobile device 110 or some distance away from the mobile device 110, as represented by the arrow 150.

The mobile device 110 can change or vary its functions, abilities, or capabilities based on the distance between the mobile device 110 and the primary user 140. As shown, the distance between the mobile device 110 and the primary user 140 may be classified or categorized with reference to one or more specified minimum or threshold distances, such as a threshold distance 120 and a threshold distance 130. The specified minimum or threshold distances can provide radii which define areas, such as the area 115 between the mobile device 110 and the threshold distance 120, the area 125 between the threshold distance 120 and the threshold distance 130, and the area 135 outside of or beyond the threshold distance 130.

In various embodiments, an electronic device such as the mobile device 110 may disable functions and/or capabilities, for example, that allow access to personal information that the primary user 140 may wish to keep private and confidential when the device is beyond a specified threshold distance from the primary user 140, and being used by others. Personal information and preferences on the device that the primary user 140 may wish to keep private may include things such as contact information (e.g., names, addresses, phone numbers, etc. of family members, friends, business associates, etc.), access information (e.g., usernames, passwords, etc.), entertainment information (e.g., playlists, copies of movies, etc.), financial information (e.g., names of financial institutions, account information, account numbers, etc.), and the like.

Examples of situations where the mobile device 110 is separated from the primary user 140 include when the primary user 140 connects the mobile device 110 to the audio system in a car or at home and gives the mobile device 110 to a friend or family member to select and play music. In another example, the primary user 140 may hand the mobile device 110 to a passenger in the back seat of a car so that the passenger may operate the navigation functions of the mobile device 110 while primary user 140 drives. For yet another example, the primary user 140 may lend the mobile device 110 to a friend, family member, or stranger so they can make a phone call. For still another example, the primary user 140 may give the mobile device 110 to a child so that the child may read an electronic book or article or use a game application. Or, the mobile device 110 may be obtained by an unauthorized user or without the primary user 140's permission.

When the primary user 140 is in physical possession of, or very close to, the mobile device 110, (e.g., within an area 115 defined by the threshold distance 120), the mobile device 110 may assume a first state, e.g., full functionality or a full set of capabilities, and when the primary user 140 is not close to the mobile device 110, (e.g., outside of an area 115 defined by the threshold distance 120), the mobile device 110 may assume a modified state, e.g., reduced functionality or a reduced set of capabilities.

In various embodiments, as the distance between the mobile device 110 and the primary user 140 increases, the functions or capabilities of the mobile device 110 decrease. For example, the mobile device 110 may disable additional functions when the primary user 140 moves from the area 125 to the area 135 (i.e., when the distance between the primary user 140 and the mobile device 110 exceeds the threshold distance 130). For instance, the mobile device 110 may disable all functions except specified games, weather and non-personalized news feeds while the mobile device 110 is more than 10 meters from the primary user 140, such as when the primary user 140 lends their mobile device 110 to another family member and does not wish that person to have access to their email or other personal information.

For another example, if the primary user 140 hands the mobile device 110 to a passenger in the back seat of a car so that the passenger can operate the navigation functions of the mobile device 110 while primary user 140 drives, if the distance between the primary user 140 and the mobile device 110 (in the back seat) exceeds threshold distance 120, then the functions or capabilities of the mobile device 110 may decrease. For instance, upon detecting that that the distance between primary user 140 and the mobile device 110 has exceeded the distance specified by the threshold distance 120, the mobile device 110 may disable various functions and capabilities, such as email, contact lists, speed dialing, social networking applications, text messaging, etc., while leaving enabled other functions and capabilities, such as navigation functions, games, etc.

In various embodiments, the mobile device 110 may include system settings that allow the primary user 140 to register or record information about one or more secondary devices, such as a secondary device 145 and/or a secondary device 147, and use those secondary devices 145, 147 to indicate presence of and distance to primary user 140 with respect to the mobile device 110. For example, the mobile device 110 may detect, measure, and/or estimate the distance between the mobile device 110 and the primary user 140 by analyzing or evaluating a connection, such as a wireless signal connection, between the mobile device 110 and an associated secondary device 145, 147 carried by the primary user 140, such as an RF-based headset or accessory (e.g., a Bluetooth® ear clip-on headset), an IR-based accessory, (e.g., IR head phones), an accessory that is purpose-designed for measuring the distance to the mobile device 110 (e.g., a purpose-designed keychain RF transmitter), or the like. For another example, the Bluetooth® system in a vehicle, such as the primary user's car, may serve as the, or one of several, registered secondary devices. This can be a convenient arrangement for some users as operation of the Bluetooth® system in the primary user's car indicates that the primary user 140, who typically possesses the car keys needed to activate the car's Bluetooth® system, is in or close to the car.

In some embodiments, the mobile device 110 may record or designate a certain person (e.g., the owner) to be the primary user 140 of the mobile device 110 because that certain person possesses or is in close proximity to the appropriate secondary device 145, 147 used to measure distance to the primary user 140. In other words, for such embodiments, registering, identifying, or pairing a particular secondary device 145, 147 with the mobile device 110 and recording that secondary device as being associated with the primary user 140, in effect, may make the person possessing that secondary device the primary user 140. In various embodiments, the secondary device 145, 147 may be a person-portable device that is capable of wirelessly connecting with the mobile device 110 or being wirelessly detected, such as RF headsets, RFID tags, and the like. In various embodiments, the secondary device 145, 147 may be registered or recorded by the mobile device 110 by storing a unique identifier of the secondary device 145, 147, by an automated exchange of keys, certificates, and/or other identification information, and the like.

In some embodiments, the mobile device 110 may confirm the identity of the user 140 using biometric subsystems in addition to, or instead of, a secondary device 145 or 147. Biometric subsystems may include voice monitoring and speaker identification via a microphone of the mobile device 110, facial image identification, eye or retina identification, head and body recognition, or other personal image recognition via a camera of the mobile device 110, walking cadence monitoring and identification via an accelerometer of the mobile device 110, fingerprint recognition via a fingerprint reader of the mobile device 110, thermal recognition via a thermal sensor of the mobile device 110, and the like. For example, the mobile device 110 may confirm the identity of the primary user 140 when the mobile device 110 detects the voice of the primary user 140 in its microphone, for instance, by comparing a voiceprint or voice model of a detected voice received by the microphone of the mobile device 110 to a previously stored voiceprint or voice model of the primary user 140. In such embodiments, the mobile device 110 may be configured to record, designate, or indicate that the primary user 140 is the primary user (e.g., owner) of the mobile device 110 based on matching a biometric profile. In some embodiments, biometric confirmation of user identity can be used instead of or in addition to evaluating distance from the primary user.

One of ordinary skill will recognize that elements, features, and functionality may be added to, removed from, or modified for the system shown in FIG. 1, to implement additional embodiments. For example, as noted above, the mobile device 110 may be any of various computerized electronic devices, such as a tablet computer, a laptop computer, a computerized game system, a computerized music player, and the like. For another example, the mobile device 110 may detect and categorize the proximity of the user 140 into fewer or more than the three areas 115, 125, and 135 shown in the example embodiment of FIG. 1. For instance, the mobile device 110 may detect when the primary user 140 physically possesses the mobile device 110 and allow different functionality compared to when the primary user 140 is within the area 115, but not in possession of the mobile device 110. For yet another example, the system shown in FIG. 1 may include a server (not shown) communicatively connected to the mobile device 110, such that the server receives from the mobile device 110 information about the current physical relationship between the mobile device 110 and the primary user 140, and responds to the mobile device 110 with information that aids in or causes a transition or change of the access state of mobile device 110 according to the current physical relationship.

Figure 2:
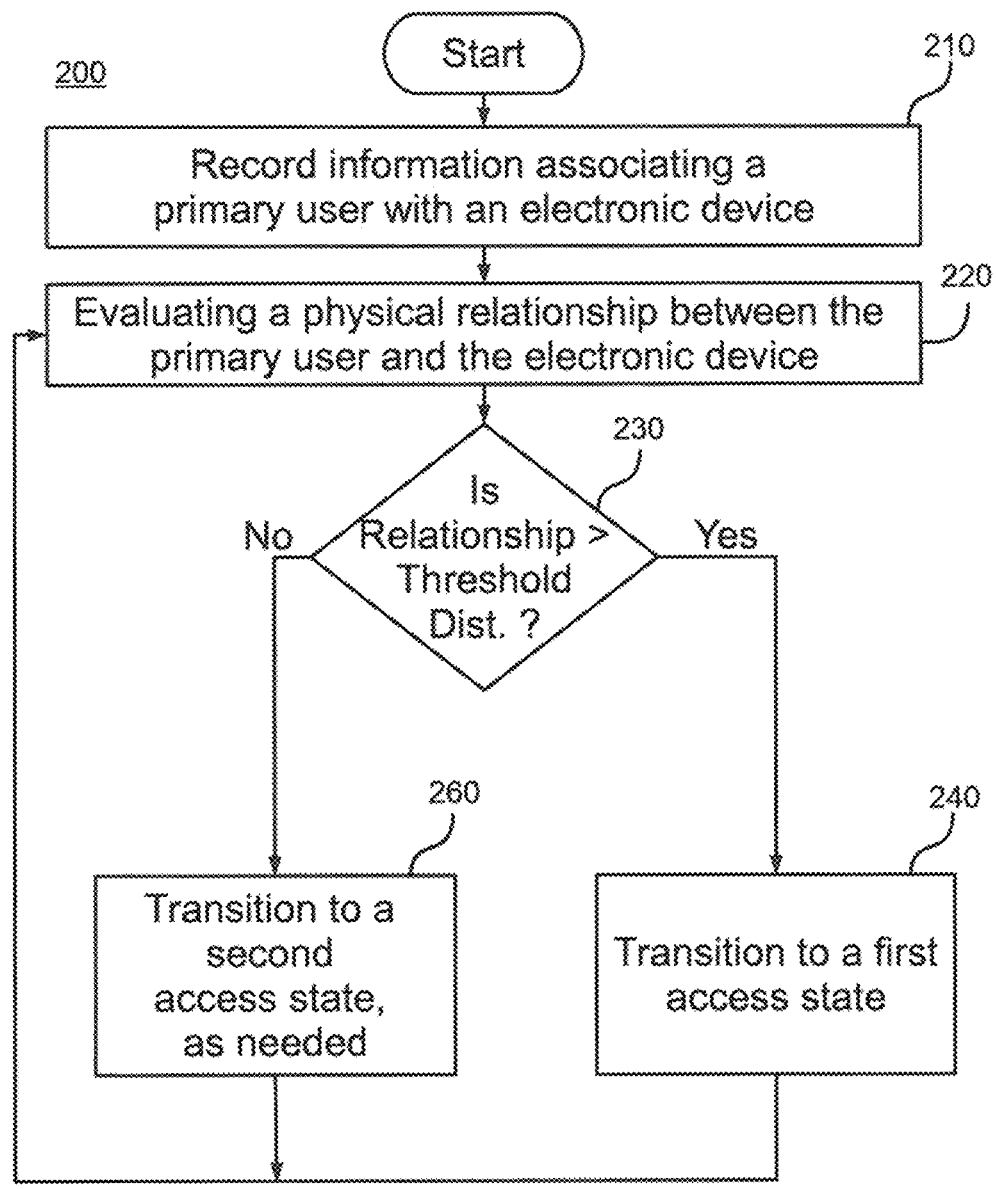
FIG. 2 is a flowchart of an example of a process for varying the capabilities of an electronic device based on user proximity, consistent with the present disclosure.

FIG. 2 is a flowchart of an example of a process 200 for varying the capabilities or functions of an electronic device based on user proximity, consistent with the present disclosure. In various embodiments, all or part of the process 200 may be implemented using a computing system or processor, such as the processor in a portable electronic device, for example, a mobile device 110 and/or a processor that is in communication with the portable electronic device, such as the processor in a server.

As shown, the process 200 begins by recording information associating a primary user with an electronic device (stage 210). In some embodiments, the electronic device may use a secondary electronic device, (e.g., the secondary device 145 or the secondary device 147), as a proxy for the primary user, such that the identity of the secondary electronic device is recorded or stored, and a person in possession of the secondary electronic is regarded as the primary user, such as primary user 140 of FIG. 1, who possesses the secondary device 145 and the secondary device 147.

In one example, the secondary device (e.g., secondary device 147) may be small, short-range, radio pulse generator, such as a key fob RF transmitter (such as one that may be attached to a key ring), which emits a radio frequency signal having a distinct digital identity code. In such embodiments, the electronic device may record, save, or register the distinct digital identity code produced by a particular radio pulse generator in a manner that designates that particular radio pulse generator as belonging to the primary user 140. In other embodiments, the electronic device may similarly register and record a particular Bluetooth® accessory in association with the primary user 140 of the electronic device, such that the Bluetooth® accessory serves as a proxy for the primary user 140.

In some embodiments, the electronic device may record information about the primary user by storing biometric data or other data identifying the primary user, such as a fingerprint data, voice/speaker identification data, image data, (e.g., facial image or eye/iris image data), password data, username data, or the like.

At stage 220, the process 200 evaluates a physical relationship between the primary user and the electronic device. An example of a physical relationship between the primary user and the electronic device is the distance between the primary user and the electronic device. In various embodiments, stage 220 may be implemented by circuitry, logic, and/or software that detects a wireless signal and/or measures the strength of the wireless signal, such as an RF or IR signal, received from a secondary device associated with the primary user, such as a Bluetooth® accessory or a radio pulse generator device. In various embodiments, any type of wireless signal, communication, or link may be used for evaluating the physical relationship (e.g., distance) between a secondary device that is carried by or otherwise associated with the primary user and the electronic device, including RF wireless signals, (such as Bluetook® signals, wifi signals, etc), microwave wireless signals, IR wireless signals, high frequency audio signals, and the like.

In an example of an embodiment that uses a Bluetooth®, class 3, one mW transceiver, such as a headset, as the secondary device, the electronic device may connect to the Bluetooth®, class 3 device and determine that the primary user is within five meters of the electronic device by virtue of the connection, because five meters is the maximum connection range of a Bluetooth® class 3 receiver. Similarly, a connection to a Bluetooth®, class 2, 2.5 mW secondary device leads the electronic device to determine or estimate that the secondary device (i.e., the primary user), is 10 meters distant or less.

In general, if two Bluetooth® devices are in communication with each other (e.g., a headset is linked to a smart phone), then the devices may determine, based on the characteristics of the Bluetooth® protocol, a distance between the two devices, or at least an estimate of a maximum distance between the two devices. For example, based on information indicating that two Bluetooth® devices are connected and information indicating the classes of the Bluetooth® devices, a maximum distance between the two devices may be determined. For another example, based on information indicating that two Bluetooth® devices are connected, information indicating the classes of the Bluetooth® devices, and information indicating the bandwidth setting of the connection, a distance between the two devices may be determined or estimated, because the lower the bandwidth of a Bluetooth® connection, the greater the distance between the two devices, and vice versa. Similar distance determinations made be made using other short-range wireless communication protocols.

The electronic device can employ a signal strength measurement to determine the distance between the devices, e.g., using known techniques. In general, the higher the signal strength from the secondary device, the closer the secondary device (i.e., the primary user) is to electronic device. For an example, if an RF (or other wireless protocol) accessory is used, based on information indicating the classes of the RF devices, and information indicating the strength of the received RF signal, the electronic device may determine or estimate a distance between the two devices, because the lower the signal strength of a RF signal received from the accessory (e.g., the secondary device 145, 147), the greater the distance between the electronic device and accessory, and vice versa. For example, when a user 140 wears a Bluetooth® or other RF headset (e.g., the secondary device 145), the mobile device 110 evaluates the distance to the Bluetooth® headset based on received RF signal strength from the headset.

In some embodiments, line-of-sight type wireless signals may allow a device to fairly accurately determine or estimate the distance to another device because a line-of-sight type signal does not typically bounce when traveling between devices. Moreover, line-of-sight type wireless signals quickly indicate if the secondary device located with the primary user has lost line of sight to the electronic device due to, for example, a wall when the primary user leaves a room containing the electronic device. In some embodiments where the secondary device (e.g., a smart key type device, a secondary device 147, etc.) may be purpose-built for measuring distance between the primary user and the electronic device, line-of-sight type wireless signals may be employed, such as those emitted by a BlueTooth™ device.

In some embodiments that do not rely solely on a secondary device 145 and/or 147 that is carried by the primary user 140, stage 220 may be implemented by circuitry, logic, and/or software that detects a signal and/or measures the strength of a wireless signal, such as an RF or IR signal, received from a bounded environment, such as an automobile or a conference room. For example, if the electronic device is paired (e.g., connected) with the primary user's previously-registered automobile Bluetooth® system, then the electronic device implementing the process 200 may determine that the distance between the primary user and the electronic device is less than three meters, which corresponds to the maximum distance between the front seat and back seat of the automobile.

Still other embodiments may employ biometric sensors, such as a microphone, camera, fingerprint reader, or the like, to gather information to determine a distance in stage 220. For example, an electronic device may use its camera to obtain an image of the face or eye of the current user, and if the image matches a previously stored image of the primary user's face or eye, then the electronic device may determine that the distance between the primary user and the device is zero—i.e., that the primary user physically possesses the device. Other implementations of stage 220 are possible.

At stage 230, the process 200 further evaluates whether or not the physical relationship between the primary user and the electronic device is greater than or exceeds a threshold distance, which may be a predetermined or primary-user-specified threshold distance. For example, with reference to FIG. 1, the mobile device 110 may estimate, calculate, or measure the distance between the primary user 140 and the mobile device 110 and then compare that distance to the threshold distance 120 and/or the threshold distance 130, which may be stored as a parameter(s) in the mobile device 110, and which may be user-configurable in some embodiments.

If the relationship between the primary user and the electronic device is greater than the threshold distance (stage 230, Yes), then the process 200 transitions the electronic device to a first access state (stage 240) and then loops back to stage 220. In various embodiments, the first access state may be a state in which a function or functions of the electronic device are disabled or otherwise limited such that a person having possession of the electronic device cannot easily access the function or functions. Examples or transitioning to a first access state may include disabling functions which allow access to or use of information that is considered personal by the primary user of the electronic device. For instance, in the case of a mobile phone or tablet computer, functions such as email, text messaging, contact lists, social networking applications, etc. may be disabled. Although this embodiment is described with respect to limiting access to privacy-related functions, the choice of functions to limit or disable is not restricted to functions in this category.

In some embodiments, the electronic device may contain a set of profiles that specify the functions and their status for each access state according to the physical relationship (e.g., the distance) between the primary user and the electronic device. For example (as illustrated in FIG. 3, discussed below), a profile that defines an access state to control functionality when the distance is zero (i.e., the primary user physically possesses the electronic device, which may be considered a zero meter threshold), a profile that defines an access state to control functionality when the distance is greater than zero and not more than five meters (five meter threshold), and a profile that defines an access state to control functionality when the distance is greater than five meters. In some such embodiments, the set of profiles may be configured by the primary user. Stated another way, profiles may be used to assign an access state to each area surrounding the electronic device, such as the areas defined by the threshold distances 120 and 130, as discussed above with respect to FIG. 1.

If the distance between the primary user and the electronic device is less than or equal to the threshold distance (stage 230, No), then the process 200 transitions the electronic device to a second access state as needed (stage 240) and then loops back to stage 220. Stage 260 may be performed as needed. For example, if stage 240 was previously performed, and the primary user and the electronic device had since changed their physical relationship (e.g., moved closer together) so that the distance between them is no longer greater than the threshold distance, then there may be a need to transition to a second access state.

In various embodiments, the second access state may be a state in which a function or functions of the electronic device are re-enabled after being disabled or otherwise made accessible such that a person having possession of the electronic device can more easily access the function or functions. In such embodiments, transitioning to a less restrictive access state may not be needed if the electronic device has not previously transitioned to a more restrictive access state, for example by performing stage 240 at an earlier time.

Examples or transitioning to a second access state may include enabling or resuming functions which allow access to or use of information that is considered personal by the primary user of the electronic device. For instance, in the case of a mobile phone or tablet computer, functions such as email, text messaging, contact lists, social networking applications, etc. may be enabled, started, made accessible, or re-enabled in stage 260. As noted above, although this embodiment is described with respect to accessing privacy-related functions, the choice of functions to enable or make accessible is not restricted to functions in this category.

Similar to that noted above with respect to stage 240, in some embodiments, stage 260 may be implemented using a set of profiles stored, for example, in the electronic device, which contain access states specifying what functions to limit and unlimit, permit access to and deny access to, enable and disable, etc., according to the physical relationship (e.g., the distance) between the primary user and the electronic device.

One of ordinary skill will recognize that stages may be added to, deleted from, modified, or reordered in the process 200 to provide additional embodiments. For example, processes may added to detect and/or consider other information about the environment of the electronic device that may be used in combination with (at least) the proximity of the primary user to vary the functionality of the device. In various embodiments, information about the environment of the electronic device may include information about the location of the device, information about the motion or velocity of the device, information about the date and time of day, etc. For instance, a process may be added to determine a location of the electronic device, for example using a GPS subsystem of the device, and further stages may be added to disable/enable functionality based on the location in conjunction with the distance between the primary user and the electronic device. In such embodiments, the proximity of the primary user may used in combination with the location of the device to determine the functionality of the device. For example, if the device was both within a specified distance from the primary user and located at the work site of the primary user, then a different set of functions or capabilities may be enabled or made accessible to a user compared to when the device is within a specified distance of the primary user and located at the home of the primary user.

Similarly the device may enable or make accessible a different set of functions or capabilities when beyond a specified distance from the primary user and located at the work site of the primary user. For instance, consider a case where the work site has a guest network and an employee network available for wifi connection (or for guest login vs. employee login), and the employee network/login allows full access to company files, while the guest network/login allows no access to company information, but allows connection to the Internet for surfing the Web, etc. In such a case, the device may enable functionality to connect to the employee network when the environmental conditions indicate within-specified-distance-of-owner-and-at-work; whereas the device may disable the functionality to connect to the employee network and enable functionality to connect to the guest network when the conditions indicate not-within-specified-distance-of-owner-and-at-work.

For another example of modifications to the process 200, stages may be added to determine temporal information, such as the time of day, which may be used in combination with (at least) the proximity of the primary user to vary the functionality of the device.

For yet another example, stages may be added to determine velocity and/or acceleration information, which may be used in combination with (at least) the proximity of the primary user to vary the functionality of the device. For instance, the device's accelerometer and/or GPS subsystem may detect that the device is moving at a speed consistent with being in an automobile, and a biometric subsystem (e.g. voice/speaker or facial identification) may detect that the device is in close proximity to primary user. For such a combination of environmental variables, the device may be configured to enable radio/music player functions and to enable use of the primary user's preset channels and preferences, while disabling texting and email (which may be dangerous or illegal while driving).

For still another example of modifications to the process 200, stage 230 may be modified to include a hysteresis effect such that the device does not immediately transition to a different access state (stages 240 and 260) when the threshold distance is exceeded, but instead waits and continues monitoring and computing distance for some period of time before proceeding to stage 240 or stage 260. For instance, if a mobile device loses its Bluetooth® connection to a headset, then it may preliminarily determine that the primary user is more than a threshold distance of five meters from the mobile device (i.e., at a distance out of Bluetooth® range), and then the device may spend 30 seconds attempting to reconnect to the headset before proceeding to change access states (e.g., which may disable function(s)), or prompt the user for a PIN or password, because the primary user is more than five meters away. The mobile device could also or alternatively enter an access state that disables the ability to initiate new requests and not terminate running processes, which may be useful to prevent accidental dropping of phone calls.

FIG. 3 illustrates examples of proximity function profiles for an electronic device. The embodiment shown organizes the profiles in a table 300, which includes three profiles that are shown in three rows, each corresponding to an access state for a distance between the electronic device and the primary user of the device: a "Possession" profile row 310, a "Within 5 Meters" profile row 320, and a "Beyond 5 Meters" profile row 330. In some embodiments, the profiles 310-330 may be stored in a storage device, memory, or the like organized as a data structure, database or the like, and accessed by a process, program, or application that enables and disables functions and capabilities of an electronic device. In some embodiments, the profiles 310-330 may be stored in a memory or other storage device that is part of a mobile device 110. In other embodiments, the profiles 310-330 may be stored in a memory or other storage device that is part of a server or other remote computing system that is communicatively connected to a mobile device.

In the embodiment shown, each access state has a profile that corresponds to a distance threshold that triggers activation of each profile. The triggering functionality is divided into three categories represented by rows 310-330: 1) capabilities for the primary user (represented by "Possession" profile row 310); 2) capabilities that are enabled for friends and family (represented by "Within 5 Meters" profile row 320); and 3) capabilities that are enabled for anyone (e.g., strangers) that handles the device (represented by "Beyond 5 Meters" profile row 330). When the primary user is configuring a device, such as their mobile device 110, to enable/disable functions and capabilities based on user proximity, they may bundle the capabilities into profiles, as shown.

As noted above, in various embodiments, the distance between the electronic device and the primary user of the device, as categorized by the profiles 310-330, may be determined by hardware and/or software subsystems or components incorporated into the device. For example, a voice identification or speaker identification subsystem of the electronic device may provide inputs to determine that the device is in the physical possession of the primary user (e.g., the voice speaking into the device's microphone is that of the primary user), such that the Possession profile 310 should be applied or activated or transitioned to. Further to this example, a Bluetooth® subsystem of the electronic device, either alone or in cooperation with the voice identification subsystem, may provide inputs to determine that the device is not in the physical possession of the primary user, but is within five meters of the primary user (e.g., the voice speaking into the microphone is not the primary user, and a Bluetooth® accessory associated with the primary user is connected; or the Bluetooth® RF signal strength indicates that the Bluetooth® accessory associated with the primary user is 3 meters away) such that the electronic device should transition to, apply, or activate the Within 5 Meters profile 320. Thus, in some embodiments that may not measure RF signal strength, although the primary user is nearby according to the Bluetooth® connected indication, the Bluetooth® connection indication may be binary and may not provide enough information to determine whether someone other than the primary user is actually using the device, so the voice monitoring and identification system (or some other subsystem of the device)

may be used to detect and determine that someone other than the primary user is using the device (e.g., is talking into the microphone of the device).

Further still to this example, the Bluetooth® subsystem may provide inputs to determine that the primary user is more than five meters away from the device (e.g., when the connection to the Bluetooth® accessory is lost or intermittent), such that the electronic device should transition to, apply, or activate the Beyond 5 Meters profile 330.

In the example shown, the table 300 includes multiple columns, each of which correspond to a function, ability, or capability of an electronic device that may be enabled, partially enabled, disabled, etc. according to the distance between the electronic device and the user of the device, including: a "Phone" column 340, a "Msging" (text messaging) column 345, an "Email" column 350, a "Calendar" column 355, a "Contacts" column 360, a "Nav"(igation) column 365, a "Games" column 370, a "Browser Credentials" column 372, etc. In this example, the Browser Credentials setting indicates whether credentials stored on the electronic device (for example, the primary user's Google® account ID, search history, saved location, news personalization settings, etc.) are accessible for use during web browsing sessions. As represented by the "Function N" column 375, table 300 may include any number "N" of additional functions, abilities, or capabilities, in addition to, or instead of, the examples specified in the columns 340-372.

In the example shown, the intersection of each row and column of the table 300 is a cell that contains an indicator designating whether the function specified by the column should be enabled ("EN") or disabled ("DIS") for the profile specified by the row. Thus, the profiles 310-330 control how the electronic device varies its functions or capabilities depending on whether the primary user is present and/or how far away the primary user is and specify or define different access states of the electronic device. For example, as illustrated by possession profile row 310, if the primary user physically possesses the device or is within a fraction of a meter of the device, all the functions or capabilities may be enabled, as access to personalized features and information is completely controlled by the primary user. As shown, all of the functions 340-375 are enabled for the access state shown by the Possession profile row 310.

As illustrated by the Within 5 Meters profile row 320, if the primary user is not in possession of the device (e.g. beyond the possession threshold distance), but is within a few meters (e.g. five meters), then the device may be limited to non-personal-information-accessing functions or capabilities such as non-personal navigation (i.e. navigation to typed-in addresses, but not to contacts), a single phone call or only non-international phone calls, music playback, but no creation of playlists or sharing, and the like. In the example shown in FIG. 3, for the access state shown by the Within 5 Meters profile row 320, only the phone function (intersection of row 320 and column 340), the nav function (intersection of row 320 and column 365) and the games function (intersection of row 320 and column 370) are enabled, with the remaining functions disabled.

As illustrated by the Beyond 5 Meters profile row 330, if the primary user is not within a few meters of the device (e.g., beyond the five meter threshold distance, which may be considered beyond the distance from which the user could reasonably supervise, monitor, or observe another's usage of the device), then the access state may specify that all functionality is disabled except games (intersection of row 330 and column 370).

In some embodiments, the table 300 may be configured and/or reconfigured by the primary user of the device according to their preferences, and the table 300 may be secured, for example by a password, such that only the primary user may reconfigure the enable/disable settings. In some embodiments, the device may indicate the profile or access state that it is currently operating under, for example, by presenting a different user interface (e.g., a home screen with a different color scheme or border scheme, etc.) for each profile, with only the enabled functions and applications displayed, or by presenting a standard user interface with the disabled functions and applications grayed out.

In some embodiments, in addition to, or instead of, the electronic device determining the proximity of the primary user and activating the appropriate profile (e.g., one of profiles represented in rows 310-330), a primary user may personally choose and activate a particular profile or access state before letting the electronic device out of their control. In such embodiments, the primary user may use controls on the electronic device, for example touch screen GUI controls or physical buttons on the electronic device, to activate the desired profile.

One of ordinary skill will recognize that the example of a table 300 shown in FIG. 3 is simplified for conciseness and clarity of explanation, and that different data structures, organizations, profiles, functions, etc. may be used, added to, removed from, modified within, or replace the table 300. For example, more or fewer columns may be used: for instance a column may be added for enabling or disabling an internet access capability, or for enabling or disabling the provision of authentication tokens or personalized information (such as personal or session identifiers) from the device to remote services, such as web services, etc.

For another example, more of fewer rows may be used: for instance, a row may be added to define a profile for an access state that is active when the device is within a specified distance of (e.g. paired with) a specific Bluetooth® equipped car, such as the primary user's car. For such a profile, the primary user may assume that family and other known persons would be using the device when it is paired with the primary user's car, and that the primary user would be in the car, and so may enable most or all of the device's functionality. In contrast, there could also be a profile specifying an access state for when the device is paired with a car that is not the primary user's, such as another family member's, and such a profile may disable various functions or capabilities.

For yet another example, in addition to proximity profiles 310-330 associated with the primary user of the device, there may also be proximity profiles specifying access states for additional, secondary users of the device (e.g., for devices that support an account for each family member, or a guest account). In such embodiments, there may be multiple user accounts on the device, such as, for example, the multiple user accounts that may be set up on devices running the Android™ operating system, and the device may determine which user is currently using the device based on which user is currently logged in. In such embodiments, the device may determine the distance between the device and the currently logged in user (for example, using the subsystems and techniques described previously), and enable/disable functions and capabilities based on the appropriate profile(s) and access state(s) for that user.

Figure 4:
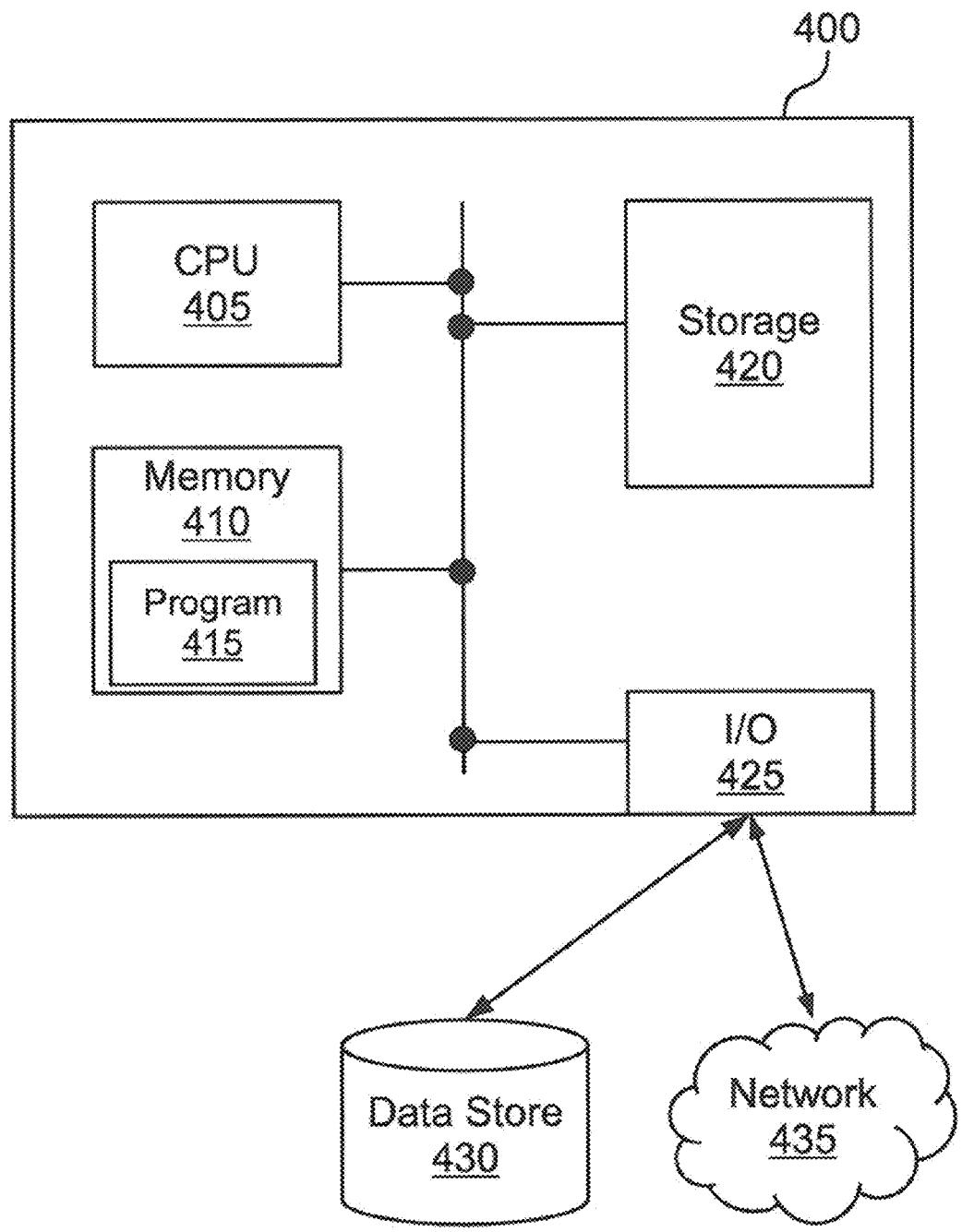
FIG. 4 is a block diagram of an example of a computing or data processing system that may be used to implement embodiments of electronic devices that are consistent with the present disclosure.

FIG. 4 is a block diagram of an example of a computing system or data processing system 400 that may be used. Other components and/or arrangements may also be used. In some embodiments, the computing system 400 may be part of a mobile electronic device, such as a smart phone, a tablet computer, a gaming device, a music playing device, etc., or the computing system 400 may be part of a server or other remote computer that communicates with a mobile device.

The computing system 400 includes a number of components, such as a central processing unit (CPU) 405, a memory 410, an input/output (I/O) device(s) 425, and a nonvolatile storage device 420. The system 400 can be implemented in various ways. For example, an implementation as an integrated platform (such as a laptop computer, a tablet computer, a netbook computer, a smart phone, a cell phone, a gaming device, a personal digital assistance device, etc.) may comprise the CPU 405, the memory 410, the nonvolatile storage 420, and the I/O devices 425. In such a configuration, the components 405, 410, 420, and 425 may connect and communicate through a local data bus. The I/O component(s) 425 may connect to external devices through a direct communication link (e.g., a hardwired, local wifi, or telephonic connection), through a network 425, such as a local area network (LAN) or a wide area network (WAN), and/or through other suitable connections. The system 400 may be standalone or it may be a subsystem of a larger system or device.

The CPU 405 may be one or more known processing devices, such as a processor from the ARM family developed by ARM Holdings plc headquartered in Cambridge, UK, and the like. The memory 410 may be one or more fast, solid-state devices configured to store instructions and information used and/or executed by the CPU 405 to perform functions, methods, and processes described herein. The storage 420 may be a volatile or non-volatile, magnetic, semiconductor, tape, optical, or other type of storage device or computer-readable storage medium, including devices such as solid state memories, EEPROMS, hard disks, CDs and DVDs, meant for long-term storage.

In the illustrated embodiment, the memory 410 contains one or more programs or subprograms 415, which may be loaded from the storage 420 or from a remote system (not shown) that, when executed by the CPU 405, perform various operations, procedures, processes, or methods described herein. Alternatively, the CPU 405 may execute one or more programs located remotely from the system 400. For example, the system 400 may access one or more remote programs via the network 435 that, when executed, perform functions and processes described herein.

In some embodiments, the memory 410 may include a program(s) 415 for altering or varying the functions or capabilities of an electronic device based on the distance of the primary user. For example, the memory 410 may include a program(s) 415 that implements the process 200 of FIG. 2 and/or the access states represented by the profiles of the table 300 of FIG. 3. In some embodiments, the memory 410 may also include other programs, subprograms, or applications that implement other methods and processes. For example, the memory 410 may include subprograms that gather, from various subsystems and external secondary devices, information relating to the physical relationship (e.g., distance) between the primary user and the system 400, including, for instance, voice information, image information, wireless signal presence and/or absence and/or connection information; wireless signal strength and/or bandwidth information, vehicle connection information, etc. For another example, the memory 410 may include subprograms that gather, from various subsystems and external devices, information relating to the location of the system 400, the movement (e.g. velocity) of system 400, the date and time of day, etc.

The memory 410 may be also be configured with other programs and/or an operating system, e.g., a mobile or other operating system.

The I/O device(s) 425 may comprise one or more input/output devices that allow data to be received and/or transmitted by the system 400. For example, the I/O device 425 may include one or more input devices, such as a keyboard, touch screen, mouse, microphone, camera, RF or IR receiver subsystem, and the like, that enable data to be input from a user. Further, the I/O device 425 may include one or more output devices, such as a display screen, LCD screen, plasma display, speaker devices, RF or IR transmitter and the like, that enable data to be output or presented to a user. The I/O device 425 may also include one or more digital and/or analog communication input/output devices that allow the computing system 400 to communicate, for example, digitally, with other machines and devices. For example, in the case of a smart phone, tablet computer, or similar mobile device, the I/O devices 425 may include a wireless communication subsystem, such as a Bluetooth® communication subsystem, that allows the system 400 to communicate with other Bluetooth® devices, such as a telephone headset or an automobile's Bluetooth®subsystem. Other configurations and/or numbers of input and/or output devices may be incorporated in the I/O devices 425.

In the embodiment shown, the system 400 is connected to a network 435 (such as one or more of a telephone network, the Internet, a private network, a virtual private network, or other network), which may in turn be connected to various systems, devices, and/or computing machines (not shown in FIG. 4). In general, the system 400 may send and receive data from external machines and devices via the network 435.

The example of an embodiment shown in FIG. 4 includes a database 430, which is depicted as a standalone database external to the system 400, such as, for example, a database 430 hosted on a server accessible by the system 400. In other embodiments, the database 430 may hosted by the computing system 400. The database 430 may comprise one or more databases that store information and are accessed and/or managed through the system 400. By way of example, the database 430 may be implemented as a relatively complex relational database or as a table or other simple data structure, for example as shown in FIG. 3. In various embodiments, the database 430 may manage and store data used to implement systems and methods consistent with the present disclosure. For example, the database 430 may store proximity profiles, such as those illustrated in FIG. 3.

The foregoing disclosure provides examples of systems and methods for altering the functions or capabilities of a mobile electronic device, such as a smart phone, variant to the presence and/or distance of the primary user from the device. It will be apparent to those skilled in the art that various modifications and variations can be made to the structures and methodologies described herein, and that they can be combined into many other different systems or applications. Other embodiments are within the scope of the following claims.

What is claimed is:

1. A method, comprising:
    storing, by a primary electronic device, information associating a user with the primary electronic device and a secondary electronic device that is carried by the user;
    determining a distance between the user and the primary electronic device based on a connection between the primary electronic device and the secondary electronic device that is carried by the user;
    reducing, by the primary electronic device, functionality of the primary electronic device responsive to determining that the distance between the user and the primary electronic device exceeds a threshold distance; and increasing, by primary electronic device, the functionality of the primary electronic device responsive to determining that the distance between the user and the primary electronic device ceases to exceed the threshold distance.

2. The method of claim 1, wherein the secondary electronic device comprises a microphone and a speaker.

3. The method of claim 1, wherein the secondary electronic device comprises a short range wireless transmitter.

4. The method of claim 3, wherein the short range wireless transmitter is a Bluetooth® transmitter.

5. The method of claim 1, wherein determining the distance between the user and the primary electronic device comprises:
   determining an estimated distance between the user and the primary electronic device; and
   comparing the estimated distance to the threshold distance to determine whether the user is located at least the threshold distance from the primary electronic device.

6. The method of claim 5, wherein determining the estimated distance is based on a strength of a signal received by the primary electronic device.

7. The method of claim 1, further comprising:
   determining a current environment of the primary electronic device, wherein reducing the functionality of the primary electronic device is based on the distance between the user and the primary electronic device and the current environment of the primary electronic device.

8. The method of claim 7, wherein determining the current environment of the primary electronic device is based on a current location of the primary electronic device.

9. The method of claim 7, wherein determining the current environment of the primary electronic device comprises:
   determining a current velocity of the primary electronic device.

10. The method of claim 1, wherein reducing the functionality of the primary electronic device comprises revoking a permission.

11. The method of claim 1, wherein reducing the functionality of the primary electronic device comprises erasing a password stored on the primary electronic device.

12. The method of claim 1, wherein reducing the functionality of the primary electronic device comprises permitting a subset of available applications to execute on the primary electronic device.

13. The method of claim 1, wherein reducing the functionality of the primary electronic device comprises permitting a subset of available applications on the primary electronic device to be accessible.

14. The method of claim 1, wherein reducing the functionality of the primary electronic device comprises changing account permissions.

15. The method of claim 14, wherein changing account permissions comprises disabling a network access permission.

16. The method of claim 14, wherein changing account permissions comprises disabling an access permission for the secondary electronic device that is registered with the primary electronic device.

17. The method of claim 1, wherein determining the distance between the user and the primary electronic device comprises:
   evaluating a proximity profile corresponding to the threshold distance.

18. The method of claim 1, wherein determining the distance between the user and the primary electronic device comprises:
   determining that the distance between the user and the primary electronic device exceeds the threshold distance;
   delaying for a period of time;
   determining that the distance between the user and the primary electronic device continues to exceed the threshold distance after the period of time.

19. An electronic device, comprising:
   a memory storing instructions; and
   a processor, operably connected to the memory, that executes the instructions to perform operations comprising:
      storing, by a primary electronic device, information associating a user with the primary electronic device and a secondary electronic device that is carried by the user;
      determining a distance between the user and the primary electronic device based on a connection between the primary electronic device and the secondary electronic device that is carried by the user;
      reducing functionality of the primary electronic device responsive to determining that the distance between the user and the primary electronic device exceeds a threshold distance; and
      increasing the functionality of the primary electronic device responsive to determining that the distance between the user and the primary electronic device ceases to exceed the threshold distance.

20. The electronic device of claim 19, wherein determining the distance between the user and the primary electronic device comprises:
   determining an estimated distance between the user and the primary electronic device; and
   comparing the estimated distance to the threshold distance to determine whether the user is located at least the threshold distance from the primary electronic device.

21. The electronic device of claim 20, wherein determining an estimated distance is based on a strength of a signal received by the primary electronic device.

22. The electronic device of claim 19, wherein the operations further comprise:
   determining a current environment of the primary electronic device, wherein reducing the functionality of the primary electronic device is based on the distance between the user and the primary electronic device and the current environment.

23. The electronic device of claim 22, wherein determining the current environment of the primary electronic device is based on a current location of the primary electronic device.

24. The electronic device of claim 19, wherein reducing the functionality of the primary electronic device comprises permitting only a subset of available applications on the primary electronic device to be accessible.

25. The electronic device of claim 19, wherein determining the distance between the user and the primary electronic device is based on a proximity profile corresponding to the threshold distance.

26. The electronic device of claim 19, wherein determining the distance between the user and the primary electronic device comprises:
   determining that the distance between the user and the primary electronic device exceeds the threshold distance;
   delaying for a period of time;

determining that the distance between the user and the primary electronic device continues to exceed the threshold distance after the period of time.

27. The electronic device of claim 19, wherein storing information associating the user with the primary electronic device comprises:
storing in the memory information identifying the secondary electronic device that communicates with the primary electronic device.

\* \* \* \* \*